(12) United States Patent
Hasler

(10) Patent No.: US 8,848,403 B2
(45) Date of Patent: Sep. 30, 2014

(54) COMPENSATION SYSTEM FOR MEDIUM OR HIGH VOLTAGE APPLICATIONS

(71) Applicant: Jean-Philippe Hasler, Vasteras (SE)

(72) Inventor: Jean-Philippe Hasler, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 14/090,372

(22) Filed: Nov. 26, 2013

(65) Prior Publication Data

US 2014/0084877 A1    Mar. 27, 2014

Related U.S. Application Data

(63) Continuation of application No. PCT/EP2011/059646, filed on Jun. 10, 2011.

(51) Int. Cl.
| | |
|---|---|
| *H02J 1/02* | (2006.01) |
| *G05F 3/00* | (2006.01) |
| *G05F 5/00* | (2006.01) |
| *H02M 1/12* | (2006.01) |
| *H02M 1/14* | (2006.01) |
| *H02M 5/42* | (2006.01) |
| *H02M 7/04* | (2006.01) |
| *H02M 7/68* | (2006.01) |
| *H02J 3/18* | (2006.01) |
| *H02M 1/42* | (2007.01) |
| *H02J 3/01* | (2006.01) |
| *H02J 3/24* | (2006.01) |

(52) U.S. Cl.
CPC .............. *H02M 1/42* (2013.01); *H02J 3/1878* (2013.01); *Y02E 40/30* (2013.01); *H02J 3/01* (2013.01); *H02J 3/1821* (2013.01); *H02J 3/24* (2013.01); *H02J 3/18* (2013.01)
USPC .................................. 363/39; 323/208; 363/87

(58) Field of Classification Search
USPC .......................... 323/208–211; 363/39–48, 87
See application file for complete search history.

(56) References Cited

U.S. PATENT DOCUMENTS 5,574,356 A * 11/1996 Parker ........................... 323/207
5,576,942 A    11/1996 Beverly et al.
(Continued)

FOREIGN PATENT DOCUMENTS

| | | |
|---|---|---|
| JP | H06165381 A | 6/1994 |
| KR | 20010083809 A | 9/2001 |
| WO | 2005022716 A1 | 3/2005 |

OTHER PUBLICATIONS

Lesnicar, et al.; "An innovative modular multilevel converter topology suitable for a wide power range"; Power Tech Conference Proceedings, 2003 IEEE Bologna (vol. 3 ); Jun. 23-26, 2003; 6 pages.

(Continued)

*Primary Examiner* — Jue Zhang
*Assistant Examiner* — Lakaisha Jackson
(74) *Attorney, Agent, or Firm* — St. Onge Steward Johnston & Reens LLC

(57) ABSTRACT

A compensating system for a power system includes a compensator including semiconductor switch means, which compensator has phase legs which on a first side of the compensator defines AC inputs for connection to a respective phase of the power system. The phase legs are connected in wye connection at a second side of the compensator, which wye connection has a neutral point. A filter arrangement at a first side thereof is connected to the neutral point of the wye connection and at a second side is connected to the AC inputs to thereby form a circuit with the compensator. The filter arrangement is arranged such that the circuit acts essentially as an open circuit for positive sequence currents or voltages and negative sequence currents or voltages, and as a closed circuit for zero-sequence currents.

13 Claims, 2 Drawing Sheets

(56) References Cited

U.S. PATENT DOCUMENTS

| | | | |
|---|---|---|---|
| 5,790,356 A * | 8/1998 | Bottrell et al. | 361/35 |
| 6,043,569 A * | 3/2000 | Ferguson | 307/105 |
| 6,862,199 B2 | 3/2005 | Escobar et al. | |
| 7,710,082 B2 | 5/2010 | Escobar Valderrama et al. | |
| 7,847,507 B2 * | 12/2010 | Wagoner | 318/599 |
| 8,207,712 B2 * | 6/2012 | Hasler | 323/208 |
| 8,385,096 B2 * | 2/2013 | Yuzurihara et al. | 363/127 |
| 8,416,595 B2 * | 4/2013 | Hasler | 363/87 |
| 2007/0109823 A1 | 5/2007 | Rastogi et al. | |
| 2010/0172166 A1 * | 7/2010 | Singh et al. | 363/131 |
| 2011/0018481 A1 | 1/2011 | Hiller | |
| 2013/0070491 A1 * | 3/2013 | Jiang-Hafner et al. | 363/41 |

OTHER PUBLICATIONS

Yoshii, et al.; "Control and Performance of a Medium-Voltage Transformerless Cascade PWM STATCOM with Star-Configuration"; Industry Applications Conference, 2006. 41st IAS Annual Meeting. Conference Record of the 2006 IEEE (vol. 4 ); Oct. 8-12, 2006; pp. 1716-1723.

IEEE Transactions on Power Electronics, Jan. 2009, pp. 45-58: "Control of a Cascade STATCOM With Star Configuration Under Unbalanced Conditions" by Qiang Song and Wenhua Liu; 2 page abstract.

IEEE Transactions on Power Delivery, Apr. 2010 pp. 543-550: "Control Scheme of Cascaded H-Bridge STATCOM Using Zero-Sequence Voltage and Negative-Sequence Current"; by Hatano and N. Ise, T. 1 page abstract.

IETE Tech Rev 2009; 26:115-36: "Design and Control of Voltage Regulators for a Standalone Power Generation"; by Gaurav Kasal, Bhim Singh; 13 pages.

Impact of STATCOM on Distance Relay, a dissertation report by Ali Abdolkhani, College of Engineering, Pune, India May 2001; 2 page description.

International Search Report and Written Opinion of the International Searching Authority Application No. PCT/EP2011/059646 Completed: Mar. 26, 2012; Mailing Date: Apr. 16, 2012 12 pages.

Hagiwara, et al; "Negative-sequence reactive-power control by the modular multilevel cascade converter based on double-star chopper-cells (MMCC-DSCC)"; Energy Conversion Congress and Exposition (ECCE), 2010 IEEE; Sep. 12-16, 2010; pp. 3949-3954.

Li, et al.; "Research of STATCOM with Four Legs Based on Double Hysteresis Current Control Method"; 2008; 2 page abstract.

IEEE Transactions on Power Delivery, Apr. 1998 pp. 538-544: Statcom Controls for Operation with Unbalanced Voltages by Hochgraf, C. and Lasseter, R.H.; 8 pages.

* cited by examiner

COMPENSATION SYSTEM FOR MEDIUM OR HIGH VOLTAGE APPLICATIONS

FIELD OF THE INVENTION

The present disclosure relates to a compensating system for a power system, and in particular to a wye-connected compensating system.

BACKGROUND OF THE INVENTION

A power system, such as an electric grid, typically comprises a transmission network which transfers power from power generating stations, e.g. power plants, and a distribution network connected to the transmission network for distribution of the power to loads, such as households and factories connected to the distribution network.

The transmission network is typically based on a Flexible Alternating Current Transmission System (FACTS) and/or a High Voltage Direct Current (HVDC) system.

AC power transmission gives rise to electromagnetic fields resulting in reactive power components in the grid e.g. due to inductive and capacitive loads and the inductance of the power lines.

By decreasing the reactive power, the active power which acts to operate loads connected to the power system can be increased. At other times, it may be desirable to provide additional reactive power to the power system in order to stabilize it.

FACTS provide stabilization of a power system by means of reactive power compensating devices such as Static VAR units and STATCOM units.

Static VAR units such as Thyristor Controlled reactors (TCR) produce harmonics of the fundamental frequency in the power system. Harmonics are undesired by-products resulting from switching the thyristors. It is normally desirable to reduce the harmonic content produced by a TCR. Especially, it is desirable to prevent or at least reduce the harmonic content generated by a wye-connected TCR to be fed into the power system. Compared to a delta-connected TCR, the $3^{rd}$, $9^{th}$, ..., $(3^n)^{th}$ harmonic content generated by a wye-connected TCR is fed into the power system, whilst for a delta-connected TCR the $3^{rd}$, $9^{th}$, ..., $(3^n)^{th}$ harmonic current is essentially trapped as a circulating current in the delta-connection.

STATCOM units utilize voltage converters comprising chain-linked, i.e. series connected, converter cells having switchable semiconductor devices. By switching the semiconductor devices properly in the converter cells, the amount of reactive power in the grid can be controlled.

Some converter topologies utilise a DC-capacitor in each converter cell, e.g. H-bridge cells, in order to control the voltage generated by each converter cell. The DC voltage over each capacitor should typically be kept constant according to a respective set-point value both during normal operation of the power system and under asymmetrical conditions.

For delta-connected STATCOM units, a circulating current is trapped in the delta-connection, enabling voltage control of the DC-capacitors in the converter cells. However, for wye-connected STATCOM units, the current of the STATCOM may be zero. Voltage control of the DC-capacitors is lost under such conditions. Therefore, in order to control the voltage level of the DC capacitors, a current has to be generated and fed to the DC-capacitors. This current is fed into the power system.

SUMMARY OF THE INVENTION

A general object of the present disclosure is to provide a wye-connected compensating system which reduces the harmonic content fed into the power system to which the compensating system is connected.

Another object is to provide voltage control of DC-capacitors of converter cells of a wye-connected compensating system also at low current operation.

Hence, in a first aspect of the present disclosure there is provided a compensating system for a power system, wherein the compensating system comprises: a compensator comprising semiconductor switch means, which compensator has phase legs which on a first side of the compensator defines AC inputs for connection to a respective phase of the power system, wherein the phase legs are connected in wye connection at a second side of the compensator, which wye connection has a neutral point; and a filter arrangement which at a first side thereof is connected to the neutral point of the wye connection and at a second side is connected to the AC inputs to thereby form a circuit with the compensator; wherein the filter arrangement is arranged such that the circuit acts essentially as an open circuit for positive sequence currents or voltages and negative sequence currents or voltages, and as a closed circuit for zero-sequence currents, wherein the filter arrangement is further arranged to block a zero-sequence current having a fundamental frequency and to allow a harmonic of the zero-sequence current to pass therethrough, whereby the harmonic of the zero-sequence current is able to flow through the closed circuit.

The power system is preferably a medium power system or a high power system.

Hence a zero-sequence current can be fed through the closed circuit because of the path provided by the filter arrangement for zero-sequence currents, thereby allowing a harmonic of the zero-sequence current to pass through the filter arrangement and flow through the closed circuit. Hence the harmonic current will not be fed into the power system. As a result unwanted harmonics can be reduced in the power system.

The filter arrangement may be arranged to allow a third harmonic of the zero-sequence current to pass through the filter arrangement. Thereby a current with a harmonic having a frequency substantially different than the fundamental frequency of the power system can flow through the closed circuit. As a result, the risk that the semiconductor switch means commence switch operations is reduced, as the semiconductor switch means are arranged such that they commence switching based on the fundamental frequency whereby e.g. reactive effect compensation can be provided during normal operation of the power system.

The filter arrangement may comprise a band-pass filter which allows the harmonic to pass therethrough. Thereby only the desired harmonic is allowed to pass through the filter arrangement.

The filter arrangement may comprise a zig-zag transformer and a capacitor in series connection with the zig-zag transformer. A zig-zag transformer has very high impedance for positive and negative sequence currents, essentially acting as an open circuit. Furthermore, a zig-zag transformer allows at least a portion of a zero-sequence current to pass therethrough. Hence, the zig-zag transformer provides for one realization of at least a portion of the filter arrangement. The capacitor provides filtering e.g. of the fundamental frequency of the zero-sequence current. Hence, the capacitance of the capacitor should generally be selected such that the filtering arrangement blocks the fundamental frequency and allows a harmonic, such as the third harmonic, to pass therethrough.

The filter arrangement may comprise a reactor in series connection with the zig-zag transformer and the capacitor.

As an alternative to the zig-zag transformer, the filter arrangement may comprise a transformer which on its primary side is connected to the AC inputs via a wye connection which provides a transformer neutral point, which transformer neutral point is in electrical connection with the neutral point of the compensator. Hence, a regular transformer which is not a zig-zag transformer may be utilised in order to provide the filter effect as described above.

The filter arrangement may comprise a capacitor connected in series with the transformer, the capacitor being arranged between the transformer neutral point and the neutral point of the compensator.

The filter arrangement may comprise a reactor connected in series with the transformer. The reactor may provide a correct impedance of the filter arrangement if the impedance of the transformer or zig-zag transformer is too low.

The compensator may be a thyristor controlled reactor, wherein each semiconductor switch means is a thyristor.

Each phase leg may have a plurality of cell converters connected in series and each cell converter comprises a DC capacitor. Thereby the DC capacitor voltage may be controlled also at conditions of low current when in prior solutions the voltage of the DC capacitor would not be controllable as essentially no current would flow through the cell converters.

Beneficially, by being able to control the DC voltage level of the individual DC capacitors in the cell converters, wye-connected voltage source converters such as STATCOM may be provided. For a wye-connected STATCOM, or other similar cell converter-based compensating devices, fewer chain-linked e.g. series-connected cell converters can be used than for delta-connected STATCOM. In particular, the required number of cell converters for a wye-connected STATCOM is the square root of the integer three less than for delta-connected STATCOM. Hence, fewer semiconductor switching means, e.g. IGBT are required, resulting in substantial cost reductions of the compensating system. To this end it is to be noted that generally each cell converter comprises a plurality of series connected IGBTs in order to be able to handle the high voltages utilised in high voltage power systems. Hereto, the filter arrangement is generally of substantially lower cost than the additional cell converters used in a delta-coupled STATCOM.

One embodiment may comprise means for controlling the voltage of each DC capacitor via the harmonic of the zero-sequence current when flowing in the closed circuit.

Each semiconductor switch means may be an Insulated-Gate Bipolar Transistor (IGBT).

The compensator may be a STATCOM.

Additional features and advantages will be disclosed in the following.

BRIEF DESCRIPTION OF THE DRAWINGS

The invention and the advantages thereof will now be described by way of non-limiting examples, with reference to the accompanying drawings of which.

DETAILED DESCRIPTION OF THE INVENTION

In the following description, for purpose of explanation and not limitation, specific details are set forth, such as particular techniques and applications in order to provide a thorough understanding of the present disclosure. However, it will be apparent for a person skilled in the art that the present disclosure may be practiced in other embodiments that depart from these specific details. In other instances, detailed description of well-known methods and apparatuses are omitted so as not to obscure the description with unnecessary details.

While in the following positive and negative sequence time varying electric signals will be referred to as positive and negative sequence currents, it is to be understood that in all cases the terms positive and negative sequence voltages, respectively, are equally valid. Thus, the positive and negative sequences can be either voltages or currents.

Figure 1:
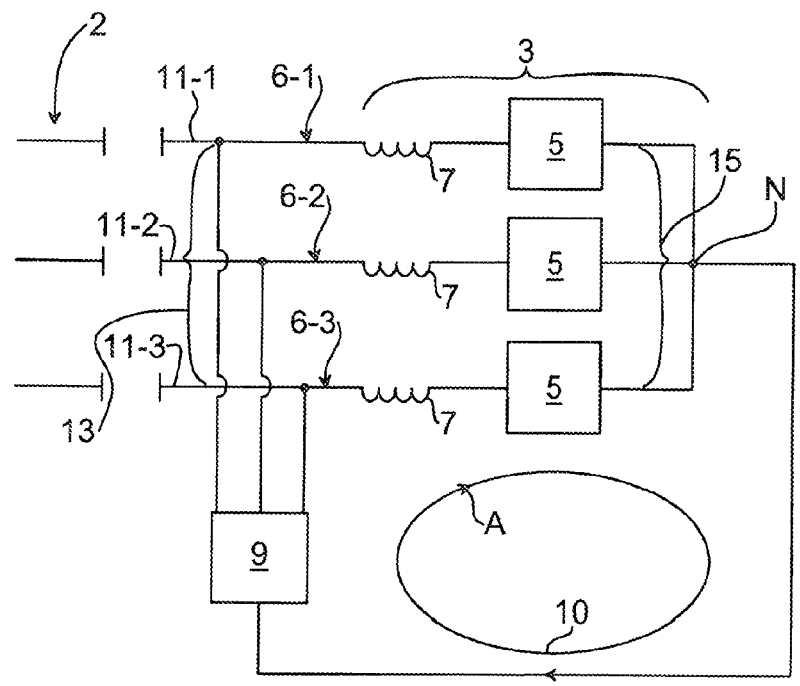
FIG. 1 schematically shows a generic topology of the compensating system according to the present disclosure.

FIG. 1 shows a generic circuit diagram of a compensating system 1 according to the present disclosure. The compensating system 1 comprises a compensator 3 having a phase leg 6-1, 6-2, 6-3 for each electric phase 11-1, 11-2, 11-3. The compensating system 1 further comprises a semiconductor unit 5 and optionally a reactor 7 at each phase leg 6-1, 6-2, 6-3. Each semiconductor unit 5 comprises semiconductor switch means. The compensator 3 has a first side 13 which defines AC inputs and which is connectable to an AC network of a high voltage power system 2. The compensator 3 has a second side 15 at which the phase legs 6-1, 6-2, 6-3 are connected in a wye-connection. The wye-connection has a neutral point N which is the point to which each phase leg 6-1, 6-2, 6-3 is connected. The neutral point N is not grounded in the examples provided herein.

The compensating system 1 comprises a filter arrangement 9 which on a first side thereof is connected to the neutral point N of the wye-connection of the compensator 3. The first side is a side which functions as an input for receiving an electric parameter such as a current from the neutral point N of the compensator 3. The filter arrangement 9 has a second side which is connected to the first side of the compensator 3. The second side of the filter arrangement 9 functions as an output of the filter arrangement 9 and provides a filtered electric parameter having been received at the first side of the filter arrangement 9.

The filter arrangement 9 together with the phase legs 6-1, 6-2, 6-3 of the compensator 3 defines a circuit 10 for each phase leg 6-1, 6-2, 6-3. The circuit 10 for the phase leg 6-3 is shown by means of arrow A. It is to be understood that corresponding circuits can be defined for the remaining phase legs 6-1 and 6-2.

The filter arrangement 9 is arranged such that the circuit 10 for each phase leg 6 essentially acts as an open circuit for positive sequence currents and negative sequence currents, and as a closed circuit for zero-sequence currents.

A positive sequence current is a three-phase current where each phase is separated by a 120 degree phase angle. The first phase has a phase angle defined to be 0 degrees, the second phase has a phase angle of 120 degrees with respect to the first phase, and the third phase has a phase angle of 240 degrees with respect to the first phase angle.

A negative sequence current also has a 120 degree phase angle between the three phases, but in a different order than for positive sequence currents. Positive and negative sequence currents are typical in a power system which is subject to symmetrical conditions, e.g. when each phase is subjected to a load providing the same impedance for each electric phase.

A zero-sequence current has essentially no phase angle between the electric phases. Zero-sequence currents may be formed for instance during asymmetrical conditions, e.g. faults, in the power system.

The filter arrangement 9 is furthermore arranged to block or filter the fundamental frequency and most of the harmonics of the zero-sequence current. The fundamental frequency is herein defined as the frequency of the voltage or current in the power system to which the compensating system 1 is connected. The fundamental frequency is typically 50 or 60 Hz. In particular, it is preferable that the filter arrangement 9 is tuned such that one harmonic is allowed to pass through the filter arrangement 9.

In one embodiment, the harmonic is the third harmonic of the zero-sequence current, which third harmonic has a frequency far removed from the fundamental frequency of the zero-sequence current. The fundamental frequency is utilised for providing switching of the semiconductor switch means. Furthermore, the third harmonic has sufficient magnitude for controlling the voltage level of DC capacitors of the semiconductor units in specific examples of the disclosure, as will be elaborated in more detail hereinbelow.

Figure 2:
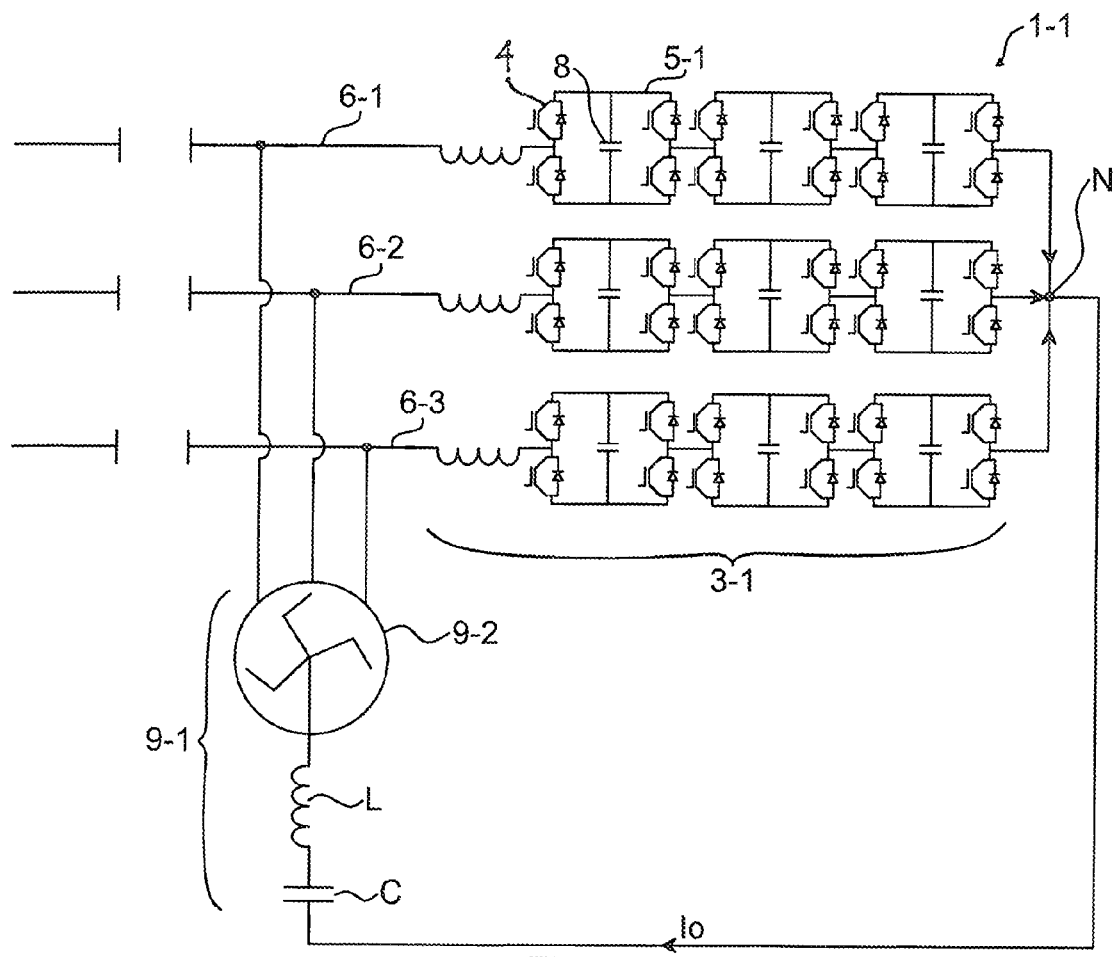
FIG. 2 shows a schematic circuit diagram of a first example of a compensating system.

FIG. 2 shows a first example of a compensating system 1-1. The compensating system 1-1 generally has the same structure as the compensating system 1, except that the semiconductor units 5 in this particular example are cell converters 5-1 comprising semiconductor switch means 4 such as IGBTs. It is to be noted that other semiconductor switch means in the cell converters are also possible within the scope of the present teachings.

Each phase leg 6 has a plurality of cell converters 5-1 connected in series thereby forming chain-linked cell converters. The chain-linked cell converters 5-1 of a phase define a semiconductor unit 5 in FIG. 1.

Each cell converter 5-1 is controlled by a control unit (not shown). The compensating system 1-1 may have an individual control unit for each cell converter, or alternatively there may be a central control unit which provides individual control signals to each cell converter for one phase leg. Alternatively the central control unit may be arranged to provide individual control signals to each cell converter for all phase legs. The control unit may be arranged to switch the semiconductor switch means 4 by means of a control signal based on a reference signal and the AC voltage provided by the power system 2 when the compensating system 1-1 is connected thereto.

Each cell converter 5-1 further comprises a DC capacitor 8 for controlling the voltage level of the output from the cell converter. Each DC capacitor voltage should preferably be kept at a set-point value such that the compensator 3-1 can provide power compensation to the power system 2 when needed. In particular, the compensator 3-1 should generally always be in a state where it is able to provide instantaneous compensation to the power system 2. By being able to control the DC voltage level of the DC capacitors also during e.g. asymmetric conditions, the wye-connected compensator 3 is able to provide compensation to the power system 2 essentially at any time.

The compensating system 1-1 may also comprise means for controlling the voltage of the DC capacitors via the zero-sequence current, based on a respective set-point value.

The filter arrangement 9-1 comprises a zig-zag transformer 9-2 and a capacitor C connected in series with the zig-zag transformer 9-2. Optionally, the filter arrangement 9-1 comprises a reactor L which is series connected with the capacitor C. The properties of the zig-zag transformer 9-2 allows the circuit 10 for each phase leg 6-1, 6-2, 6-3 to essentially act as an open circuit for positive sequence currents and negative sequence currents, and as a closed circuit for zero-sequence currents.

As an alternative to the zig-zag transformer 9-2, a transformer such as regular power transformer may be utilised in the filter arrangement. In this case, the primary windings of the transformer are wye-connected with the phase legs of the compensator at the first side of the compensator. Furthermore, a neutral point, in the following termed a transformer neutral point, of the wye-connected primary side of the transformer is connected in series with a capacitor and optionally also with a reactor L. The capacitor is connected to the neutral point N of the wye-connected second side of the compensator. The secondary side of the transformer is delta connected. The secondary winding of the secondary side can for example feed auxiliary power supply for the compensator.

The capacitor C together with the impedance of the zig-zag transformer, or as in the above-described variation, the impedance of the transformer, defines a filter arranged to block the fundamental frequency of the zero-sequence current. In one variation, the filter is a band-pass filter arranged to only allow the one harmonic, such as the third harmonic, of the zero-sequence current to pass therethrough.

By providing the filter arrangement 9-2, a zero-sequence current $I_0$ is able to flow through the closed circuit for each phase leg 6-1, 6-2 and 6-3. The voltage level of the DC capacitors 8 may thereby be controlled such that the DC voltage levels of the DC capacitors 8 correspond to their set-point values when there is no current supply to the phase legs 6-1, 6-2, 6-3 from the power system 2. Beneficially, when compensation is needed in the power system 2, the compensator 3 will be able to provide essentially instantaneous power compensation because the DC capacitors 8 have voltage levels corresponding essentially to their set-point values.

When the power system 2 is in a normal operational state, providing e.g. positive sequence currents, the impedance of the zig-zag transformer 9-2 will be very high and essentially act as an open circuit. Hence, in this case no current will flow in the circuit 10.

In a preferred embodiment, the compensator 3-1 is a STAT-COM. It is to be noted that the structure of the cell converters is not limited to the structure of FIG. 2. Indeed, the cell converters can have any topology utilised in e.g. STATCOM units.

Figure 3:
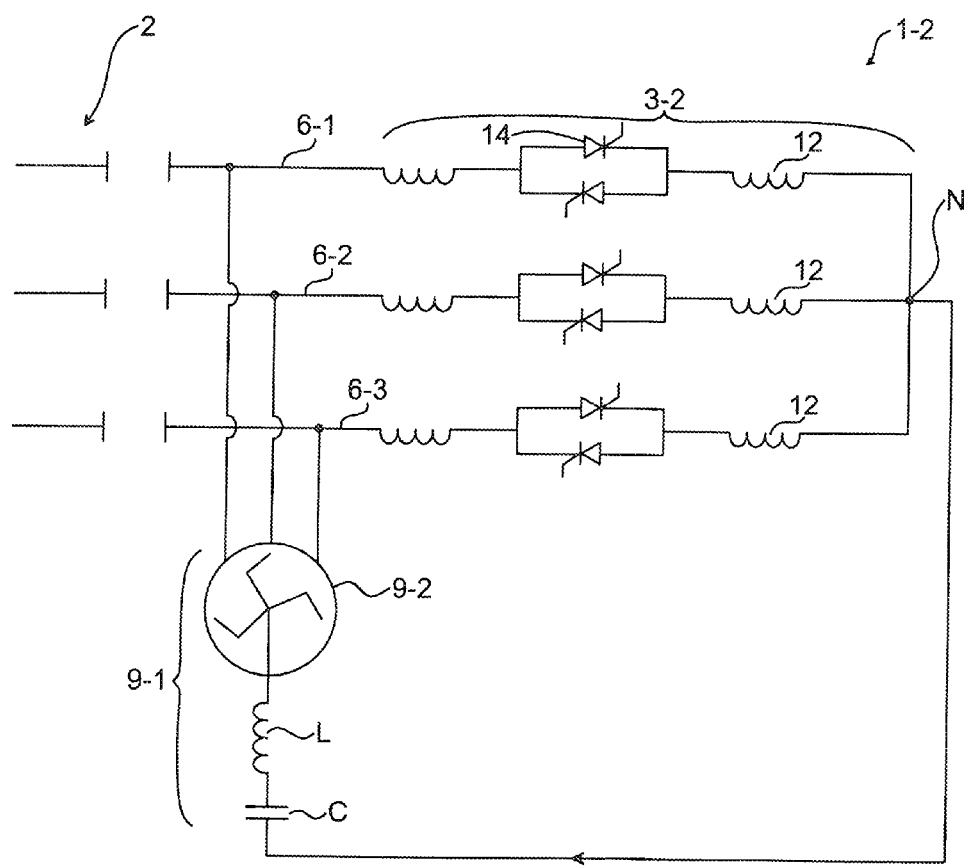
FIG. 3 shows a schematic circuit diagram of a second example of a compensating system.

FIG. 3 shows a second example of a compensating system 1-2. The compensating system 1-2 generally has the same structure as the compensating system 1, except that the semiconductor units 5 in the second example for each phase leg 6-1, 6-2, 6-3 are anti-parallel coupled thyristors 14, and that each phase leg 6-1, 6-2, 6-3 comprises an additional reactor 12. In particular, the compensator 3-2 is a thyristor controlled reactor (TCR).

The thyristors 14 are controllable by a control unit (not shown). The compensating system 1-2 may have an individual control unit for each thyristor 14, or alternatively there may be a central control unit which provides individual control signals to each thyristor 14 for one phase leg. Alternatively the central control unit may be arranged to provide individual control signals to each thyristor 14 for all phase legs. The control unit may thereby be arranged to switch the thyristors 14 by means of a control signal based on a reference signal and the AC voltage provided by the power system 2.

The filter arrangement 9-2 is the same filter arrangement as described with reference to FIG. 2, and can hence either comprise a regular transformer or a zig-zag transformer, as has been elaborated hereabove.

The compensating system 1-3 provides for a TCR which traps $3^{rd}, 9^{th}, \ldots, (3^n)^{th}$ harmonics which are generated due to switching of the thyristors 14. In particular, the harmonic content is trapped in the circuit 10 for each phase leg 6-1, 6-2, 6-3.

The present disclosure enables wye-connection of a compensator such as a static VAR compensator or a STATCOM, and may be utilised for high voltage applications in an electric grid.

The skilled person in the art realizes that the present invention by no means is limited to the examples described hereabove. On the contrary, many modifications and variations are possible within the scope of the appended claims.

What is claimed is:

1. A compensating system for a power system, wherein the compensating system comprises:
   a compensator comprising semiconductor switch means, which compensator has phase legs which on a first side of the compensator defines AC inputs for connection to a respective phase of the power system, wherein the phase legs are connected in wye connection at a second side of the compensator, which wye connection has a neutral point, and
   a filter arrangement which at a first side thereof is connected to the neutral point of the wye connection and at a second side is connected to the AC inputs to thereby form a circuit with the compensator,
   wherein the filter arrangement is arranged such that the circuit acts essentially as an open circuit for positive sequence currents and voltages and negative sequence currents or voltages, and as a closed circuit for zero-sequence currents, wherein the filter arrangement is further arranged to block a zero-sequence current having a fundamental frequency and to allow a harmonic of the zero-sequence current to pass therethrough, whereby the harmonic of the zero-sequence current is able to flow through the closed circuit.

2. The compensating system as claimed in claim 1, wherein the filter arrangement is arranged to allow a third harmonic of the zero-sequence current to pass through the filter arrangement.

3. The compensating system as claimed in claim 1, wherein the filter arrangement comprises a band-pass filter which allows the harmonic to pass therethrough.

4. The compensating system as claimed in claim 1, wherein the filter arrangement comprises a zig-zag transformer and a capacitor in series connection with the zig-zag transformer.

5. The compensating system as claimed in claim 4, wherein the filter arrangement comprises a reactor in series connection with the zig-zag transformer and the capacitor.

6. The compensating system as claimed in claim 1, wherein the filter arrangement comprises a transformer which on its primary side is connected to the AC inputs via a wye connection which provides a transformer neutral point, which transformer neutral point is in electrical connection with the neutral point of the compensator.

7. The compensating system as claimed in claim 6, wherein the filter arrangement comprises a capacitor connected in series with the transformer, the capacitor being arranged between the transformer neutral point and the neutral point of the compensator.

8. The compensating system as claimed in claim 6, wherein the filter arrangement comprises a reactor connected in series with the transformer.

9. The compensating system as claimed in claim 1, wherein the compensator is a thyristor controlled reactor, wherein each semiconductor switch means is a thyristor.

10. The compensating system as claimed in claim 1, wherein each phase leg has a plurality of cell converters connected in series and each cell converter comprises a DC capacitor.

11. The compensating system as claimed in claim 10, comprising means for controlling the voltage of each DC capacitor via the harmonic of the zero-sequence current when flowing in the closed circuit.

12. The compensating system as claimed in claim 10, wherein each semiconductor switch means is an IGBT.

13. The compensating system as claimed in claim 10, wherein the compensator is a STATCOM.

* * * * *